(12) United States Patent
Equit et al.

(10) Patent No.: US 9,074,692 B2
(45) Date of Patent: Jul. 7, 2015

(54) VALVE MANIFOLD

(75) Inventors: Alexander Equit, Berlin (DE); Ralf Kettemann, Neuenstein-Kirchensall (DE)

(73) Assignee: Buerkert Werke GmbH, Ingelfingen (DE)

( * ) Notice: Subject to any disclaimer, the term of this patent is extended or adjusted under 35 U.S.C. 154(b) by 210 days.

(21) Appl. No.: 13/047,134

(22) Filed: Mar. 14, 2011

(65) Prior Publication Data

US 2011/0226366 A1 Sep. 22, 2011

(30) Foreign Application Priority Data

Mar. 16, 2010 (DE) .................... 20 2010 003 666 U

(51) Int. Cl.
| | | |
|---|---|---|
| F15B 13/00 | (2006.01) | |
| F16K 11/22 | (2006.01) | |
| E03B 1/00 | (2006.01) | |
| G05D 16/06 | (2006.01) | |
| F16K 1/00 | (2006.01) | |
| F16K 3/00 | (2006.01) | |
| F16K 5/00 | (2006.01) | |
| F16K 7/00 | (2006.01) | |
| F16K 11/00 | (2006.01) | |
| F16K 15/00 | (2006.01) | |
| F16K 17/00 | (2006.01) | |
| F16K 11/20 | (2006.01) | |
| F16K 7/14 | (2006.01) | |

(Continued)

(52) U.S. Cl.
CPC ................. *F16K 7/14* (2013.01); *F16K 11/207* (2013.01); *F16K 11/022* (2013.01); *F16K 27/0236* (2013.01)

(58) Field of Classification Search
CPC ......... F16K 27/003; F16K 7/126; F16K 7/16; F16K 11/20; F16K 11/10
USPC .......................... 137/597, 861, 886, 884, 613
See application file for complete search history.

(56) References Cited

U.S. PATENT DOCUMENTS

| | | | |
|---|---|---|---|
| 5,706,859 A | 1/1998 | Backlund | |
| 5,794,659 A * | 8/1998 | DuRoss et al. | ................ 137/597 |
| 5,971,025 A | 10/1999 | Backlund | |

(Continued)

FOREIGN PATENT DOCUMENTS

| | | |
|---|---|---|
| EP | 0684535 | 11/1995 |
| EP | 0972148 | 3/2004 |

OTHER PUBLICATIONS

German Search Report, dated Jul. 11, 2011.

(Continued)

*Primary Examiner* — John K Fristoe, Jr.
*Assistant Examiner* — Hailey K Do
(74) *Attorney, Agent, or Firm* — Carlson, Gaskey & Olds, PC

(57) ABSTRACT

A valve manifold has a housing including a central mixing chamber and a shell surface. The shell surface has at least two valve ports that are each associated with one valve. A first valve port has three openings and the additional valve ports each have at least two, preferably three openings. A respective first opening of the valve ports is in direct fluid communication with the central mixing chamber, and the second and third openings of the valve ports are each in fluid communication with an inflow or outflow via a duct. An external port is provided which is in direct fluid communication with the mixing chamber via a duct.

18 Claims, 6 Drawing Sheets

(51) Int. Cl.
*F16K 11/02* (2006.01)
*F16K 27/02* (2006.01)

(56) References Cited

U.S. PATENT DOCUMENTS

| | | | |
|---|---|---|---|
| 6,234,203 B1 | 5/2001 | Backlund | |
| 6,237,637 B1 | 5/2001 | Kovacs et al. | |
| 6,250,332 B1 * | 6/2001 | Backlund | 137/597 |
| 6,397,887 B1 * | 6/2002 | Crissman et al. | 137/597 |
| RE42,084 E * | 2/2011 | Backlund | 137/883 |
| 2005/0072481 A1 * | 4/2005 | Hanada et al. | 137/884 |
| 2005/0252562 A1 | 11/2005 | Muller | |

OTHER PUBLICATIONS

Extended European Search Report and Written Opinion for European Application No. EP 11 00 2193 mailed Nov. 5, 2013.

* cited by examiner

VALVE MANIFOLD

RELATED APPLICATION

This application claims priority to German Application No. 20 2010 003 666.6, which was filed Mar. 16, 2010.

FIELD OF THE INVENTION

The present invention relates to a valve manifold having a housing including a central mixing chamber and a shell surface, with the shell surface having at least two ports for one valve each. A first valve port has three openings, and additional valve ports each have at least two, preferably three openings, one respective opening of each valve port being in direct fluid communication with the central mixing chamber and second and third openings of the valve ports each being in fluid communication with an inflow or outflow via a duct.

BACKGROUND

Valve manifolds are used for mixing different liquids. The valve manifold has a plurality of inflows through which different liquids or gases can be supplied, and one or more outflows through which the liquids or gases can be drained from the valve manifold. The inflows into the central mixing chamber and the outflows out of the central mixing chamber are controlled by diaphragm valves which can shut off the inflows into or the outflows from the central mixing chamber. EP 0 972 148 B1, for example, discloses a diaphragm valve which is adapted to individually shut or open two inflows to and two outflows from a central chamber, so that two inflows or outflows can be controlled by a common valve.

In order to remove residues of a liquid from the valve manifold, for instance if a different mixing ratio is needed or if a mixing with a previously used liquid is to be avoided, it has been necessary to rinse the entire valve manifold. The ports need to be removed, as a result of which any liquids remaining in the inflows will be lost. In addition, after cleaning and connecting the ports, it is required to fill the dead spaces in the ports again, resulting in a high consumption of the liquids.

It is therefore important to provide a valve manifold which allows a simpler and more efficient cleaning of the valve manifold.

SUMMARY

A valve manifold has a housing that includes a central mixing chamber and a shell surface. The shell surface of the valve manifold has at least two ports that are each associated with one valve. A first valve port has three openings and additional valve ports each having at least two, preferably three openings. A respective first opening of the valve ports is in direct fluid communication with the central mixing chamber, and second and third openings of the valve ports are each in fluid communication with an inflow or outflow via a duct. An external port, which is in direct fluid communication with the mixing chamber via a duct, is provided on the valve manifold. The mixing chamber can be rinsed via this duct or via this external port, independently of the valves, the inflows, and outflows. The ports need not be removed from the valve manifold, so that a faster cleaning of the central mixing chamber is possible. Furthermore, only the mixing chamber or an outflow that communicates fluidically with the mixing chamber is rinsed, for example by using a valve. The mixing chamber and the outflow are cleaned completely, so that in a subsequent mixing process no residues can enter the new mixture. The other ducts and the valves are not rinsed, so that they may remain filled with other liquids to be mixed and need not be unnecessarily emptied. This allows the waste of liquids during rinsing to be considerably reduced.

The duct which is in fluid communication with the external port preferably has a slope towards the mixing chamber in relation to a plane arranged perpendicularly to a longitudinal axis of the housing. In the installed state, the longitudinal axis of the housing is disposed to be vertical, so that a plane arranged perpendicularly to the longitudinal axis is arranged horizontally. The duct that is in fluid communication with the external port is inclined with respect to this plane, so that, following gravity, a liquid introduced at the external port will automatically flow into the mixing chamber.

To prevent any residual rinsing liquid from being left in the duct, the duct has a constant slope, so that no valleys are present in which any residual liquids can remain behind.

Ideally, the duct has a slope on the order of 3° to 10° to ensure that the cleaning medium or the liquid is reliably drained.

In one example, a bottom of the mixing chamber, in relation to a plane arranged perpendicularly to a longitudinal axis of the housing, has a slope towards the first opening of the first valve port. A rinsing medium introduced into the mixing chamber will thus automatically flow out of the mixing chamber, so that following the rinsing process an automatic, residue-free emptying of the mixing chamber is possible.

Preferably, at least one opening of the first valve port is in fluid communication with an outflow, so that a rinsing medium or some other liquid can be conducted directly from the mixing chamber into an outflow.

The opening of the first valve port in communication with the outflow is ideally arranged lower than a lowermost point of the mixing chamber.

In relation to a plane arranged perpendicularly to a longitudinal axis of the housing, the ducts which are in fluid communication with an outflow preferably have a slope from the respective valve port toward the outflow. Any liquid present in the valve manifold or in the valves can thus follow gravity to flow out of the outflow. In conjunction with an inclined bottom of the mixing chamber and/or an inclined duct fluidically communicating with the external port, a complete self-emptying of the valve manifold or the mixing chamber is thus ensured after the rinsing of the mixing chamber.

In relation to a plane arranged perpendicularly to the longitudinal axis of the housing, the ducts which are in fluid communication with an inflow also ideally have a slope from the inflow to the respective opening of the valve port. A complete self-emptying of the manifold is therefore ensured not only after a rinsing process, but also when rinsing occurs through one of the other ports.

To make sure that no residues are left behind in the ducts, the ducts ideally have a constant slope or a constantly increasing slope. This ensures the total self-emptying function of the valve manifold.

The shell surface of the valve manifold has at least two side faces, with a valve port being provided on each side face. The side faces have a geometry such that a valve can be attached thereto, irrespective of the shape of the shell surface.

In order to ensure the accessibility of the individual valves or the valve ports, the side faces are preferably arranged evenly distributed on the periphery of the shell surface.

Preferably, two side faces are provided which are disposed opposite each other in the peripheral direction.

The openings of a valve port may be arranged, for example, one behind the other in the direction of the longitudinal axis, that is, in the installed state the openings of the valve port are arranged vertically one above the other. As a result, a liquid, following gravity, can flow from a top opening towards the opening located underneath.

But it is also conceivable that the openings of a valve port are arranged side by side in the direction of the longitudinal axis, that is, in the installed state of the valve manifold, the openings are arranged horizontally next to each other.

To attach the valves, attachment devices, in particular boreholes, are preferably provided on the shell surface, for attachment of a valve thereto.

BRIEF DESCRIPTION OF THE DRAWINGS

Further advantages and features will be apparent from the description below in conjunction with the accompanying drawings, in which.

DETAILED DESCRIPTION

Figure 1:
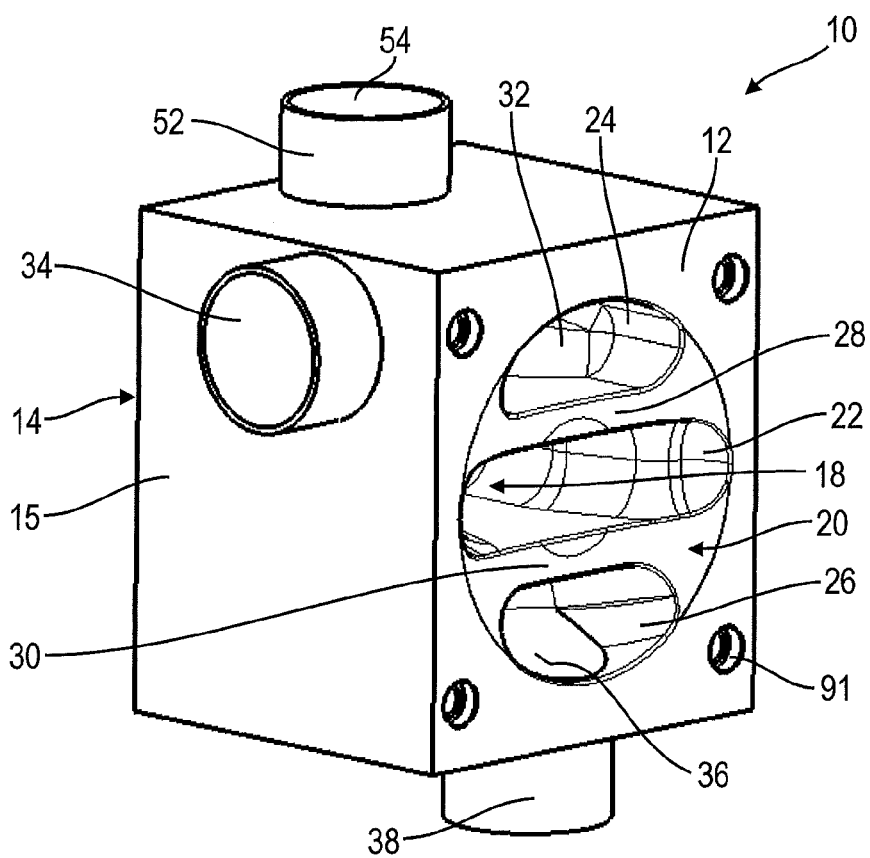
FIG. 1 shows a first embodiment of a valve manifold for an assembly according to the invention.
Figure 2:
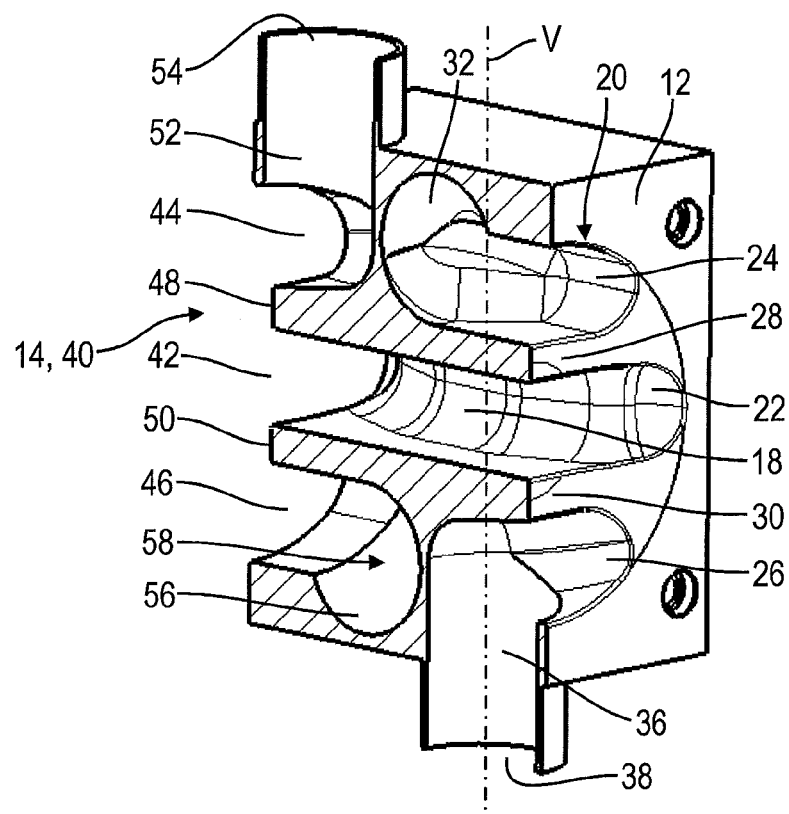
FIG. 2 shows a vertical sectional view of the valve manifold of FIG. 1.

The first embodiment of a valve manifold 10 shown in FIGS. 1 and 2 has a central mixing chamber 18 for mixing different liquids or gases, and two side faces 12, 14 which are arranged here in a diametrically opposed relationship on the shell surface 15 of the valve manifold 10.

Provided on the first side face 12 is a first valve port 20 which has three openings 22, 24, 26 which are each separated from each other by webs 28, 30. The first opening 22 is in direct fluid communication with the central mixing chamber 18. The second opening 24 communicates with an inflow 34 via a duct 32. The third opening 26 communicates with an outflow 38 via a duct 36.

Ports that are arranged fluidically upstream of the central mixing chamber 18 in the installed state of the valve manifold 10, that is, are arranged above the central mixing chamber 18 as related to a vertical longitudinal axis V in the installed state of the valve manifold, are referred to as inflows here. Ports that are arranged fluidically downstream of the central mixing chamber 18, that is, are located below the central mixing chamber 18 as related to the vertical longitudinal axis V in the installed state, are correspondingly referred to as outflows. But it is also conceivable to feed a liquid into the valve manifold 10 via an outflow, i.e. a port arranged below the central mixing chamber 18.

By analogy with the first side face 12, the second side face 14 has a second valve port 40 provided thereon which has a first opening 42, a second opening 44, and a third opening 46 which are each separated from each other by webs 48, 50. Here, too, the first opening 42 is in direct fluid communication with the central mixing chamber 18. The second opening 44 communicates with an inflow 54 via a duct 52. The third opening 46 communicates with an outflow 58 via a duct 56.

Each side face 12, 14 is provided with attachment devices 91, in this case boreholes, to attach a diaphragm valve to the respective valve port 20, 40. The function of the diaphragm valve will be explained below with reference to the first valve port 20:

The diaphragm valve has a diaphragm which can be pressed both against the first web 28 and against the second web 30 by a control. When the diaphragm is pressed against both webs 28, 30, the diaphragm valve shuts off the complete valve port 20, so that all openings 22, 24, 26 are shut off. When the diaphragm is pressed only against the first web 28, the first opening 22 and the third opening 26 are in fluid communication. When the diaphragm is pressed against the second web 30, the first opening 22 is in fluid communication with the second opening 24. When the diaphragm does not rest against either of the first web 28 and the second web 30, all three of the openings 22, 24, 26 are in fluid communication with each other.

Each valve or each valve port 20, 40 can thus be used to control two inflows or outflows 34, 38, 54, 58 each. In the valve manifold shown here, four outflows or inflows 34, 38, 54, 58 can therefore be controlled using only two valves. Since a medium can be introduced into the central mixing chamber 18 via each of the inflows 34, 54 or outflows 38, 58, it is possible to feed a liquid into the central mixing chamber 18 via three inflows (assuming that at least one outflow is necessary). As a result, a mixing of up to three liquids is possible using only two valves.

For cleaning the valve manifold 10, a cleaning medium is introduced into the valve manifold via an inflow 34, 54 or an outflow 38, 58. Subsequently, the valves are opened to drain the cleaning medium. To prevent the cleaning medium or any other medium from causing any impurities in the central mixing chamber 18 or in the valve manifold 10, no residues of the cleaning medium or other medium may remain in the valve manifold after the cleaning process. This is evidenced by using a riboflavin test, for example. In a riboflavin test the entire valve manifold 10 is sprayed with a highly adhesive, fluorescent liquid and is tested for any residues of the fluorescent liquid after a cleaning cycle.

By switching the valves appropriately, a cross flow-through from the inflow 34 to the outflow 58 and subsequently from the inflow 54 to the outflow 38 is possible in the valve manifold according to the first embodiment. In this way, the interior space of the valve manifold can be completely cleaned, which is a great advantage over the prior art.

Figure 3:
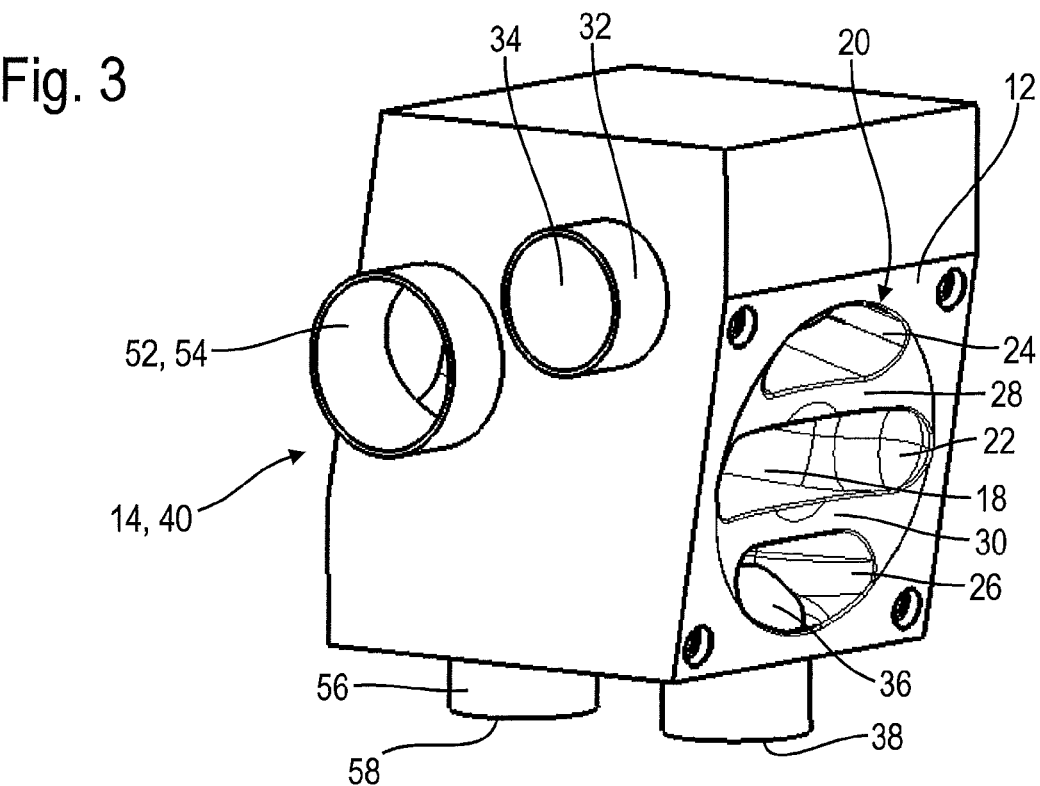
FIG. 3 shows a second embodiment of a valve manifold for a valve assembly according to the invention.
Figure 4:
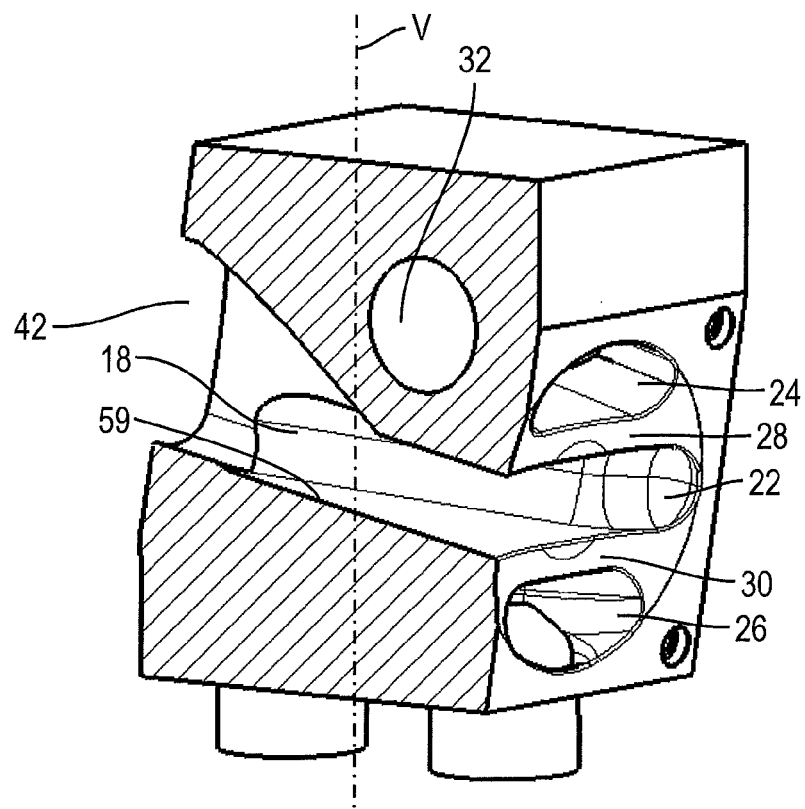
FIG. 4 shows a vertical sectional view of the valve manifold of FIG. 3.
Figure 5:
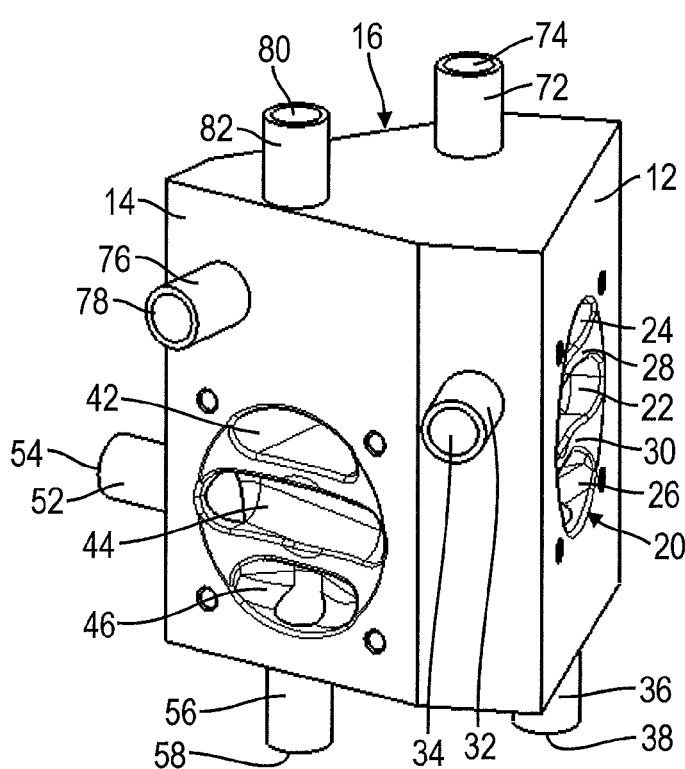
FIG. 5 shows a third embodiment of a valve manifold.

FIGS. 3 and 4 show a second embodiment of the valve manifold 10, which substantially corresponds to the valve manifold shown in FIGS. 1 and 2 with regard to its structure. However, unlike in the first embodiment, the inflow 34, which communicates with the second opening 24 of the first valve port, is provided on the shell surface 15 of the valve manifold 10

The valve manifold 10 here includes a central mixing chamber 18 having a bottom 59 which has a slope in relation to a plane arranged perpendicularly to the vertical longitudinal axis V of the valve manifold 10. The bottom 59 of the mixing chamber 18 is inclined toward the first opening 22 of the first valve port 20, so that when the valves are open, a medium, following gravity, flows from the central mixing chamber 18 to the first opening 22 of the first valve port 20.

With the valve in the open condition, the medium can flow from the first opening 22 into the third opening 26 and thus flow off to the outflow 38. The central mixing chamber 18 is therefore self-emptying when the valves are open, i.e. no further operating steps are required for cleaning or for a complete emptying of the central mixing chamber 18.

The ducts 32, 36, 52, 56 likewise each show a slope to the respective valve port 20, 40. Upon opening of the valves, the ducts 32, 52, following gravity, empty themselves into the central mixing chamber 18 via the respective valve port 20, 40. Owing to the slope of the bottom 59, the central mixing chamber 18 empties itself to the third opening 26 of the first valve port 20 and thus into the outflow 38.

The ducts 32, 36, 52, 56 and the bottom 59 of the central mixing chamber 18 here have a constant slope or a slope that constantly increases towards the respective valve port 20, 40, i.e. the ducts 32, 36, 52, 56 and the central mixing chamber 18 do not have any valleys in which any residual liquids may collect.

This means that when the valves are fully open, the valve manifold 10 is self-emptying, i.e. upon opening of the valves, a complete emptying of the valve manifold 10 takes place. In a riboflavin test, no liquid residues could be detected in the valve manifold 10 after a cleaning process.

FIGS. 5 to 9 show a third embodiment of a valve manifold 10 having a central mixing chamber 18. The valve manifold 10 shown here has three side faces 12, 14, 16 each having a respective valve port 20, 40, 60 arranged thereon.

The structure of the first valve port 20 substantially corresponds to that of the first valve port 20 illustrated in FIGS. 3 and 4. The valve port has three openings 22, 24, 26 which are separated from each other by webs 28, 30. The first opening 22 is in fluid communication with the central mixing chamber 18. The second opening 24 communicates with an inflow 34 via a duct 32, and the third opening 26 is in fluid communication with an outflow 38 via a duct 36. As can be seen in particular in FIG. 6, the second opening 24 communicates with a further inflow 35 via an additional duct 33.

The second valve port 40 is vertically offset here in relation to the first valve port 20, that is, it is located below the first valve port 20. Deviating from the exemplary embodiment illustrated in FIGS. 3 and 4, here the first opening 42 which communicates with the central mixing chamber 18 is arranged in the vertical direction above the second and third openings 44, 46. Here too, the second opening 44 is in communication with an inflow 54 via a duct 52, the inflow 54 being provided on the shell surface 15. The third opening 46 communicates with an outflow 58 via a duct 56.

Figure 6:
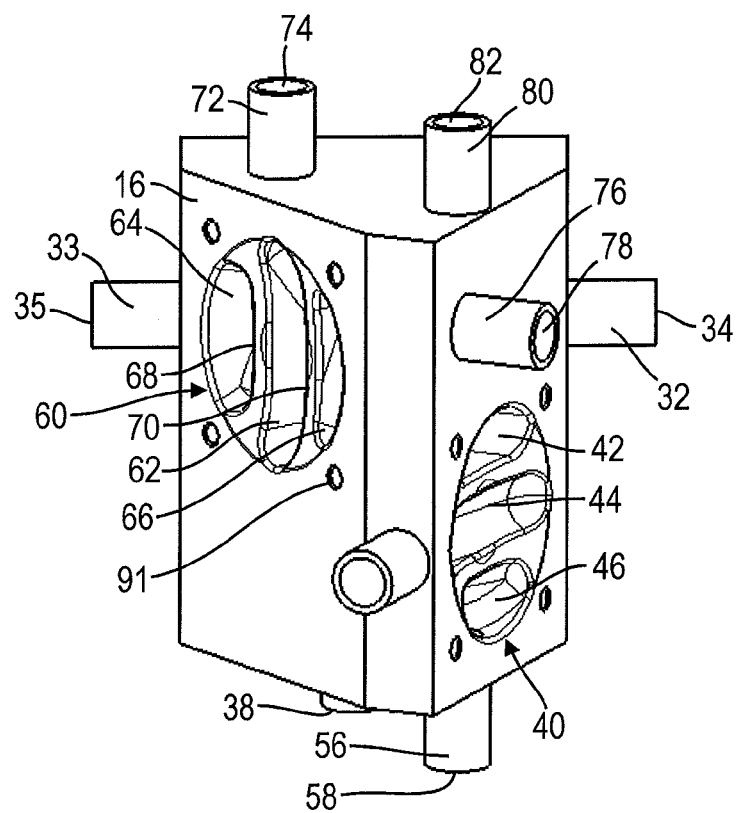
FIG. 6 shows a second view of the valve manifold of FIG. 5.
Figure 7:
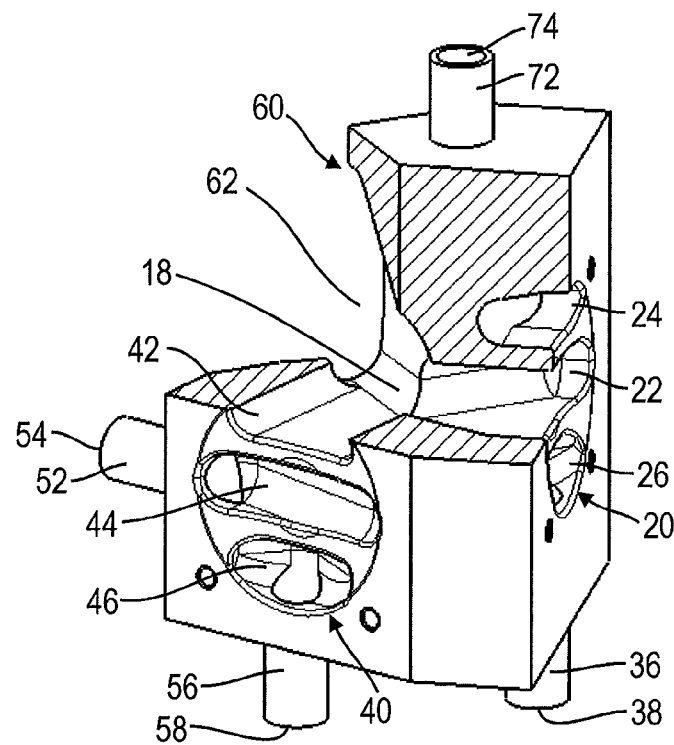
FIG. 7 shows a partial sectional view of the valve manifold of FIG. 5.
Figure 8:
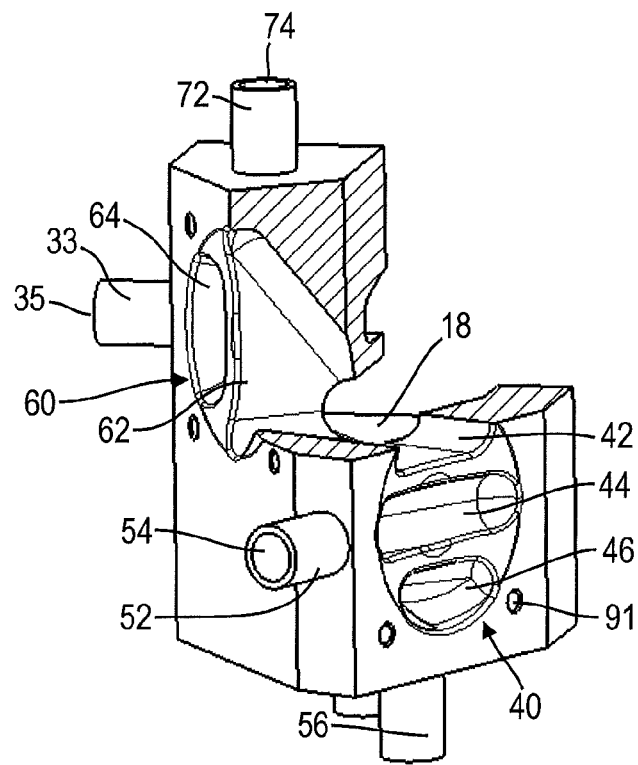
FIG. 8 shows a second partial sectional view of the valve manifold of FIG. 5.
Figure 9:
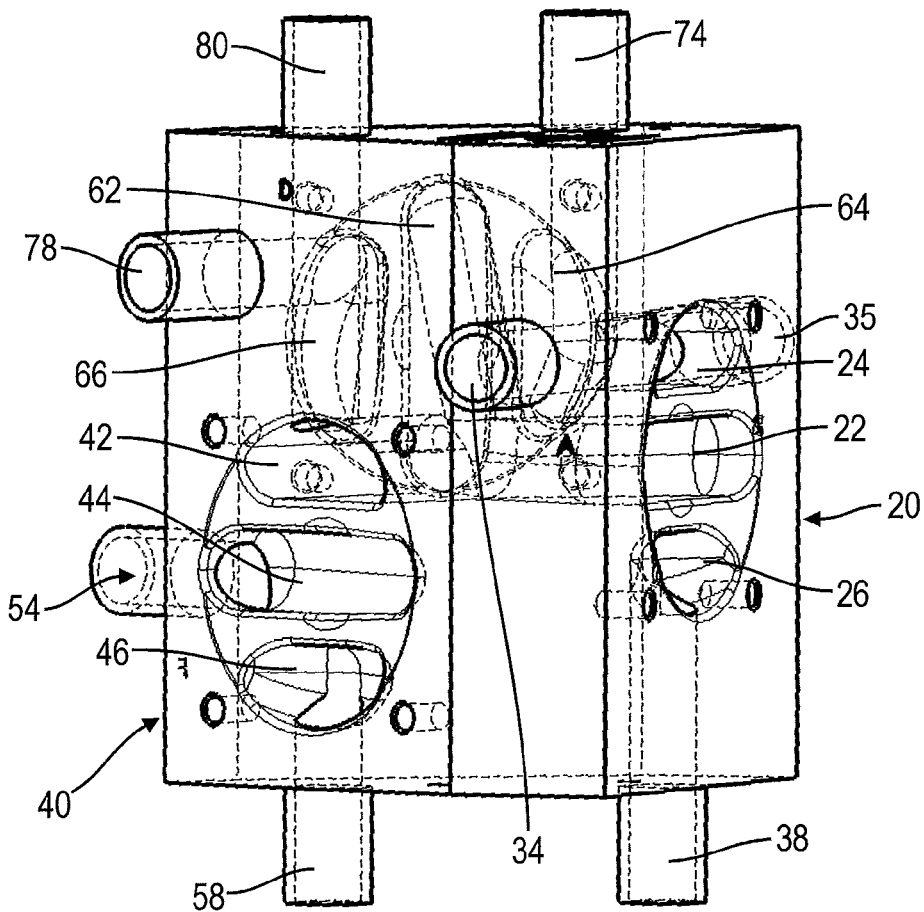
FIG. 9 shows a complete view of the valve manifold of FIG. 5.

As can be seen in particular in FIG. 6, the third valve port 60 likewise has three openings 62, 64, 66 which, in contrast to the first valve port 20 and the second valve port 40, are arranged side by side here, that is, the webs between the openings 62, 64, 66 extend in the direction of the vertical longitudinal axis V. Here, too, the first opening 62 is in fluid communication with the central mixing chamber 18. The second opening 64 and the third opening 66 are each in communication with an inflow 74, 78 via a duct 72, 76.

This means that the valve manifold 10 shown here has a total of six ports, or seven, as the case may be, which can be controlled by three valves. Assuming that one outflow is provided for the mixed liquid, it is therefore possible to introduce different liquids into the central mixing chamber 18 via five or six ports and to mix them, using three valves.

The advantage of the third embodiment according to FIGS. 5 to 9 over the second embodiment according to FIGS. 3 and 4 consists in that it is easier to clean.

In the valve manifold 10 illustrated in FIGS. 3 and 4, cleaning of the mixing chamber 18 requires, for one thing, removal of a port to be able to introduce the cleaning medium into the valve manifold. For another, a complete emptying of the valve manifold, i.e. including the valves and all outflows and inflows, is required.

Usually, however, it is only necessary to rinse the central mixing chamber 18 in order to avoid, in a new mixing process, any impurities caused by residues from the previous mixing process.

The valve manifold 10 illustrated in FIGS. 5 to 9 additionally has an external port 80 on the top side. This external port 80 is in direct fluid communication with the mixing chamber 18 via a duct 82. A cleaning medium can be directly introduced into the central mixing chamber 18 via this external port. To rinse the mixing chamber 18, it is merely required to open an outflow connected with the mixing chamber, preferably the lowermost outflow in the vertical direction.

In this way, no complete emptying of the ducts of the valve manifold 10 is necessary, so that a substantial amount of liquid may be saved. Further, the cleaning may be effected considerably faster and in a less complicated manner since it is not necessary to remove another port in order to introduce the rinsing fluid into the mixing chamber 18. For rinsing the mixing chamber 18 it is only required to open the communication between the first opening 22 and the third opening 26 on the first valve port 20, so that the cleaning medium can flow from the central mixing chamber 18 into the outflow 38.

Figure 10:
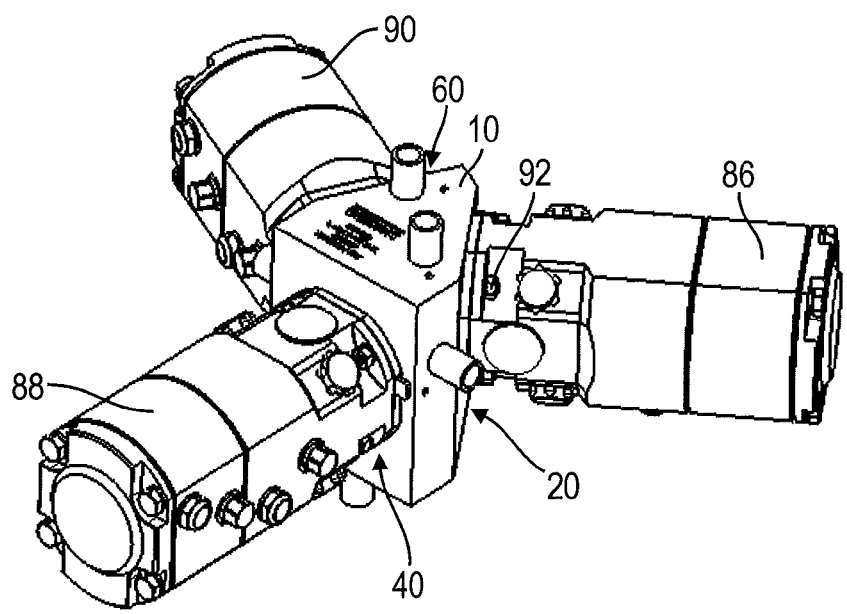
FIG. 10 shows a valve assembly according to the invention with the valve manifold of FIG. 5.
Figure 11:
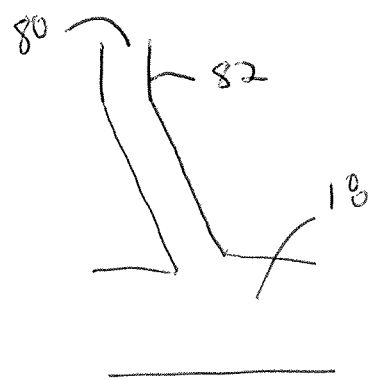
FIG. 11 is a schematic representation of an external port of the valve manifold as connected to a mixing chamber.

FIG. 10 shows a valve assembly 84 with a valve manifold 10 according to the invention. Each valve port 20, 40, 60 has a diaphragm valve 86, 88, 90 attached to it. Using suitable attachment structure, in this case bolts 92 for example, the diaphragm valves 86, 88, 90 are each attached to the attachment devices 91 on the side faces 12, 14, 16. Here, the side faces 12, 14, 16 are disposed evenly distributed on the periphery of the shell surface, so that as large an amount of space as possible is provided around the valves 86, 88, 90 or the side faces 12, 14, 16 for mounting, maintenance and/or dismounting of the valves 86, 88, 90. Deviating from this, however, any other desired arrangement of the valve ports 20, 40, 60 is also conceivable. Also, unlike in the exemplary embodiments illustrated here, the valve manifold 10 may also include more than three side faces 12, 14, 16.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A valve manifold comprising:
a body having at least first, second, and third side faces;
a mixing chamber formed within the body;
at least first and second valve ports arranged on an external surface of the body such that the first valve port is formed on the external surface of the first side face and the second valve port is formed on the external surface of the second side face, and wherein each valve port of the at least first and second valve ports is adapted to receive a diaphragm valve;
wherein each valve port of the at least first and second valve ports includes a first opening, a second opening, and a third opening wherein each first opening is in direct fluid communication with the mixing chamber, each second opening is in fluid communication with a dedicated second opening flow duct, and each third opening is in fluid communication with a dedicated third opening flow duct;

and wherein each first opening and second opening are separated by a first web accessible at each of a respective one of the at least first and second valve ports for a respective diaphragm valve, and wherein each first opening and third opening are separated by a second web accessible at the respective on of the at least first and second valve ports for the respective diaphragm valve;

one additional fluid connection which extends in the body from an external port on the external surface of the body directly into the mixing chamber, wherein the external port is separate from the first and second valve ports; and wherein the first, second, and third side faces form a periphery of the body, and wherein the first, second, and third side faces extend in a vertical direction between upper and lower end faces of the body, and wherein the external port is formed within the upper end face and comprises a direct inflow to the mixing chamber without flowing through the dedicated second and third opening flow ducts of the first and second valve ports.

2. The valve manifold of claim 1 wherein the body has first, second, and third side faces to form a polygonal shaped body.

3. The valve manifold of claim 1 wherein the body includes at least first, second, third, and fourth side faces to form a polygonal shaped body.

4. The valve manifold according to claim 1 wherein the dedicated second opening flow duct is arranged above the mixing chamber.

5. The valve manifold of claim 1 wherein the at least first and second valve ports comprise at least first, second, and third valve ports with the first valve port being formed on the external surface of the first side face, the second valve port being formed on the external surface of the second side face, and the third valve port being formed on the external surface of the third side face, and wherein each of the first, second, and third valve ports includes the first opening, second opening, and third opening.

6. The valve manifold of claim 5 wherein the external port is separate from the first, second, and third valve ports.

7. The valve manifold of claim 1 wherein in an operating position of the body, the mixing chamber has a bottom which extends with a first slope towards each first opening, each dedicated second opening flow duct extends with a second slope towards each second opening, and each dedicated third opening flow duct extends with a third slope towards each third opening, wherein each of the first, second, and third slopes is greater than zero.

8. The valve manifold of claim 7 wherein each of the first, second and third slopes is constant.

9. The valve manifold of claim 7 wherein each of the first, second and third slopes is in the order of 3° to 10° with respect to a horizontal plane.

10. A valve manifold comprising:
a body having at least first, second, and third side faces;
a mixing chamber formed within the body;
at least first and second valve ports arranged on an external surface of the body such that the first valve port is formed on the external surface of the first side face and the second valve port is formed on the external surface of the second side face, and wherein each valve port of the at least first and second valve ports is adapted to receive a diaphragm valve;
wherein each valve port of the at least first and second valve ports includes a first opening, a second opening, and a third opening wherein each first opening is in direct fluid communication with the mixing chamber, each second opening is in fluid communication with a dedicated second opening flow duct, and each third opening is in fluid communication with a dedicated third opening flow duct;
and wherein each first opening and second opening are separated by a first web accessible at each of a respective one of the at least first and second valve ports for a respective diaphragm valve, and wherein each first opening and third opening are separated by a second web accessible at the respective on of the at least first and second valve ports for the respective diaphragm valve; and
one additional fluid connection which extends in the body from an external port on the external surface of the body directly into the mixing chamber, wherein the external port is separate from the first and second valve ports;
wherein the at least first and second valve ports comprise at least first, second, and third valve ports with the first valve port being formed on the external surface of the first side face, the second valve port being formed on the external surface of the second side face, and the third valve port being formed on the external surface of the third side face, and wherein each of the first, second, and third valve ports includes the first opening, second opening, and third opening;
wherein the external port is separate from the first second and third valve ports; and
wherein the external port is arranged above the first, second, and third valve ports.

11. A valve manifold comprising:
a body having at least first, second, and third side faces;
a mixing chamber formed within the body;
at least first and second valve ports arranged on an external surface of the body such that the first valve port is formed on the external surface of the first side face and the second valve port is formed on the external surface of the second side face, and wherein each valve port of the at least first and second valve ports is adapted to receive a diaphragm valve;
wherein each valve port of the at least first and second valve ports includes a first opening, a second opening, and a third opening wherein each first opening is in direct fluid communication with the mixing chamber, each second opening is in fluid communication with a dedicated second opening flow duct, and each third opening is in fluid communication with a dedicated third opening flow duct;
and wherein each first opening and second opening are separated by a first web accessible at each of a respective one of the at least first and second valve ports for a respective diaphragm valve, and wherein each first opening and third opening are separated by a second web accessible at the respective on of the at least first and second valve ports for the respective diaphragm valve; and
one additional fluid connection which extends in the body from an external port on the external surface of the body directly into the mixing chamber, wherein the external port is separate from the first and second valve ports;
wherein the dedicated second opening flow duct is arranged above the mixing chamber; and
wherein the dedicated third opening flow duct is arranged below the mixing chamber.

12. The valve manifold according to claim 11 wherein each of the dedicated second and third opening flow ducts is fluidly connected to a dedicated inflow or outflow opening at the external surface of the body.

13. A valve manifold comprising:
a body having at least first, second, and third side faces;
a mixing chamber formed within the body;
at least first, second, and third valve ports arranged on an external surface of the body such that the first valve port is formed on the external surface of the first side face, the second valve port is formed on the external surface of the second side face, and the third valve port is formed on the external surface of the third side face, and wherein each valve port of the at least first, second, and third valve ports is adapted to receive a diaphragm valve;
wherein each valve port of the at least first, second, and third valve ports includes a first opening, a second opening, and a third opening wherein each first opening is in direct fluid communication with the mixing chamber, each second opening is in fluid communication with a dedicated second opening flow duct, and each third opening is in fluid communication with a dedicated third opening flow duct;
and wherein each first opening and second opening are separated by a first web accessible at each of a respective one of the at least first, second, and third valve ports for a respective diaphragm valve, and wherein each first opening and third opening are separated by a second web accessible at the respective on of the at least first, second, and third valve ports for the respective diaphragm valve;
one additional fluid connection which extends in the body from an external port on the external surface of the body directly into the mixing chamber, wherein the external port is separate from the first, second, and third valve ports;
wherein the external port comprises a direct inflow to the mixing chamber without flowing through any of the dedicated second and third opening flow ducts of the first, second, and third valve ports; and
wherein the at least first, second, and third side faces form a periphery of the body, and wherein the first, second, and third side faces extend in a vertical direction between upper and er end faces of the body, and wherein the external port is formed within the upper end face.

14. The valve manifold of claim 13 wherein in an operating position of the body, the mixing chamber has a bottom which extends with a first slope towards each first opening, each dedicated second opening flow duct extends with a second slope towards each second opening, and each dedicated third opening flow duct extends with a third slope towards each third opening, wherein each of the first, second, and third slopes is greater than zero.

15. The valve manifold of claim 14 wherein each of the first, second and third slopes is constant.

16. The valve manifold of claim 14 wherein each of the first, second and third slopes is in the order of 3° to 10° with respect to a horizontal plane.

17. The valve manifold according to claim 14 wherein each of the dedicated second and third opening flow ducts is fluidly connected to a dedicated inflow or outflow opening at the external surface of the body.

18. A valve manifold comprising:
a body having at least first, second, and third side faces;
a mixing chamber formed within the body;
at least first and second valve ports arranged on an external surface of the body such that the first valve port is formed on the external surface of the first side face and the second valve port is formed on the external surface of the second side face, and wherein each valve port of the at least first and second valve ports is adapted to receive a diaphragm valve;
wherein each valve port of the at least first and second valve ports includes a first opening, a second opening, and a third opening wherein each first opening is in direct fluid communication with the mixing chamber, each second opening is in fluid communication with a dedicated second opening flow duct, and each third opening is in fluid communication with a dedicated third opening flow duct;
and wherein each first opening and second opening are separated by a first web accessible at each of a respective one of the at least first and second valve ports for a respective diaphragm valve, and wherein each first opening and third opening are separated by a second web accessible at the respective on of the at least first and second valve ports for the respective diaphragm valve;
one additional fluid connection which extends in the body from an external port on the external surface of the body directly into the mixing chamber, wherein the external port is separate from the first and second valve ports;
wherein the external port is separate from the first, second, and third valve ports; and
wherein the external port is arranged above the first, second, and third valve ports.

* * * * *